(12) United States Patent
Schwarz et al.

(10) Patent No.: US 11,476,528 B2
(45) Date of Patent: Oct. 18, 2022

(54) BATTERY BOX FOR ELECTRIC VEHICLES (71) Applicant: CONSTELLIUM SINGEN GMBH, Singen (DE)

(72) Inventors: Kai Schwarz, Gottmadingen (DE);
Matthias Kutscher, Constance (DE);
Jochen Wiedemann, Radolfzell (DE);
Jakob Mannherz, Singen (DE);
Thomas Schmid, Radolfzell (DE)

(73) Assignee: CONSTELLIUM SINGEN GMBH, Singen (DE)

( * ) Notice: Subject to any disclaimer, the term of this patent is extended or adjusted under 35 U.S.C. 154(b) by 534 days.

(21) Appl. No.: 16/605,827

(22) PCT Filed: Apr. 26, 2018

(86) PCT No.: PCT/EP2018/060675
§ 371 (c)(1),
(2) Date: Oct. 17, 2019

(87) PCT Pub. No.: WO2018/202522
PCT Pub. Date: Nov. 8, 2018

(65) Prior Publication Data
US 2020/0130516 A1   Apr. 30, 2020

(30) Foreign Application Priority Data

May 5, 2017 (EP) .................................... 17169734

(51) Int. Cl.
*H01M 50/20* (2021.01)
*B60L 50/64* (2019.01)
(Continued)

(52) U.S. Cl.
CPC ............. *H01M 50/20* (2021.01); *B21D 11/08* (2013.01); *B60K 1/04* (2013.01); *B60L 50/15* (2019.02); *B60L 50/64* (2019.02)

(58) Field of Classification Search
CPC ........ H01M 50/20; B60L 50/64; B60L 50/15; B21D 11/08; B60K 1/04
See application file for complete search history.

(56) References Cited

U.S. PATENT DOCUMENTS

| 8,739,909 B2 | 6/2014 | Hashimoto et al. |
| 2007/0141451 A1 | 6/2007 | Marukawa et al. |

(Continued)

FOREIGN PATENT DOCUMENTS

| CN | 104795611 A | 7/2015 |
| CN | 204516872 U | 7/2015 |

(Continued)

OTHER PUBLICATIONS

Chinese Office Action, dated Nov. 30, 2021, corresponding to Chinese Application No. 2018800289802.
(Continued)

*Primary Examiner* — Jane J Rhee
(74) *Attorney, Agent, or Firm* — Ladas & Parry LLP; Malcolm J. MacDonald (57) ABSTRACT

A battery box for electric or hybrid motor vehicles, comprising a peripheral frame which has a generally convex polygonal shape, a bottom part and a top cover; the bottom part being joined to a lower surface of the peripheral frame, said peripheral frame comprising at least an aluminum extruded element, bent in a single direction in at least a position along the extrusion longitudinal direction according an angle wherein said bent aluminum extruded element at the said position presents at least two different inner radii of curvatures.

14 Claims, 5 Drawing Sheets

(51) Int. Cl.
*B60L 50/15*   (2019.01)
*B21D 11/08*   (2006.01)
*B60K 1/04*    (2019.01)

(56) References Cited

U.S. PATENT DOCUMENTS

2008/0173488 A1   7/2008   Takasaki
2009/0236161 A1   9/2009   Takasaki et al.
2012/0247850 A1  10/2012   Hashimoto et al.
2016/0111761 A1   4/2016   Kopra et al.

FOREIGN PATENT DOCUMENTS

| CN | 204885367 U | 12/2015 |
|----|-------------|---------|
| CN | 106207044 A | 12/2016 |
| CN | 205930892 U | 2/2017 |
| DE | 10 2012 100 977 B3 | 7/2013 |
| DE | 10 2012 200 350 A1 | 7/2013 |
| DE | 10 2014 226 566 B3 | 4/2016 |
| EP | 1939026 A1 | 7/2008 |
| EP | 2623353 A1 | 8/2013 |
| EP | 2766247 A1 | 8/2014 |
| EP | 2 887 419 A1 | 6/2015 |
| JP | 2013-107117 A | 6/2013 |
| WO | 2011061571 A1 | 5/2011 |
| WO | 2018/065554 A1 | 4/2018 |

OTHER PUBLICATIONS

International Search Report, dated May 25, 2018, corresponding to International Application No. PCT/EP2018/060675.

BATTERY BOX FOR ELECTRIC VEHICLES

FIELD OF THE INVENTION

The present invention concerns the field of electric or hybrid motor vehicles.

The present invention concerns more particularly battery boxes of such an electric or hybrid motor vehicle, consisting of a peripheral frame which has a generally convex polygonal shape in planar view, a bottom part which is joined to the lower surface of the peripheral frame made of aluminum alloy and a top cover for closing.

STATE OF THE ART

A battery box may comprise a chamber receiving electrical energy storage cell element units, enabling production of electrical energy for driving the electric or hybrid vehicle. The units of electrical energy storage cell elements are placed in the battery box, after which the battery box is mounted in an electric or hybrid motor vehicle.

An electric motor vehicle or hybrid vehicle (vehicle which is provided with an internal combustion engine) requires a large number of batteries for driving a motor. Some examples of battery box of conventional batteries for electrical vehicles can be in references EP 1939026, US 2007/0141451, US 2008/0173488, US 2009/0236162, EP 2623353.

Such a battery box is required to have a robustness which prevents the container from being easily deformed even when the vehicle has an accident, and a protective function which, even when deformation reaches the container, minimizes breakage of the batteries. Therefore, a battery box is requested to have a strength which can sufficiently cope with an impact accident. CN106207044 discloses a carbon fiber composite material battery box made of carbon fiber interlayers, PVC foam laminated, allowing to increase the stiffness and the performance of side impact. CN205930892 discloses a utility model which uses honeycomb baffle structure in place of the bottom part to improve crash safety performance. EP2766247 proposes the use of shells and a free deformation space between the lateral wall of the battery sub-compartment and the vehicle body longitudinal beam.

A battery box is also required to have watertightness, avoiding the ingress of any fluid into the chamber of the battery box or the leakage of any electrolyte contained into the electrical energy storage cell elements out of the chamber of the battery box. Watertightness is particularly mandatory when the battery box is fixed under the floor of the vehicle to prevent water or mud ingress.

It is also of interest to have a temperature control of the electrical energy storage cell elements to ensure a constant temperature system to increase the battery mileage. CN204885367 utility model discloses the use of a cooling fan at the top of the battery box. CN204516872 utility model proposes a battery box with side walls provided with a plurality of outside extensions to allow air flowing. CN104795611 discloses a temperature control module which comprises a circulating pipeline for transmitting heat conduction fluid medium.

In order to improve the running performance of a vehicle, a battery box has to be optimized in weight while at the same time offering maximum resistance to crash, watertightness, ability to accommodate temperature control and ability to contain the maximum number of electrical energy storage cell elements. Indeed, the capacity of the chamber for a given weight and volume of the battery box to contain the maximum number of cell elements is an issue that the invention aims to solve.

A battery box includes: a bottom part and an outer peripheral frame formed to be positioned on an outer peripheral edge portion of the bottom part; the outer peripheral frame being commonly joined to the bottom part by assembling means such as welding, bonding to ensure the resistance of the assembly and the watertightness of the edges between the bottom part and the peripheral frame. Sealing means are preferentially also used at the interface between the bottom part and the peripheral frame. A top plate or cover is placed on the peripheral frame from above. The top cover is assembled to the peripheral frame by assembling means, such as rivets or screws. It can also be sealed to ensure the watertightness between the peripheral frame and the top cover.

The peripheral frame and/or the top cover and/or bottom part are commonly made in aluminum to reduce the weight of the structure. They can be either sheets or profiles. Hollow profiles are preferred in particular for the peripheral frame to improve the crash resistance. Hollow profiles are also of interest to allow, either fluid circulation for temperature control or encapsulation of cooling means, such as phase change materials that allow to limit temperature increase, like it is described in US 20160111761.

Electrical energy storage cell elements are commonly rectangular. Consequently, the most appropriate geometry of a battery box is a rectangular box. DE102014226566, U.S. Pat. No. 87,739,909 describes for example such a rectangular battery box.

To ensure the maximum volume capability of a rectangular battery box, it is important to ensure that the angles of the peripheral frame are 90° or close to this value. Unless, if a lower or higher angle is obtained, typically less than 85° or higher than 95°, it induces a loss of space for the casing of battery boxes.

If extruded products are used for the peripheral frame, a rectangular peripheral frame can be obtained by connecting one to the other while insuring a 90° angle, +/−5° between two adjacent profiles.

To achieve such geometry, DE102012200350 A1 discloses an arrangement for fastening at least one electrical energy store in a hybrid or electric vehicle. The housing of the energy store is made of frame members, which are connected with corner connectors. The JP5552109 discloses also a frame of a battery housing, which are connected with angle profiles. In contrast to the DE 10 2012 200 350 A1, the corner profile presents a U-shape in which the frame member is inserted. The corner profile and the frame member are connected by means of screw connections and welding joining elements. DE102014226566 discloses a battery housing or battery case wherein at least side walls of the battery case are composed of a strut structure, where the periphery of the strut structure is connected by node elements.

Another possibility is also to join the frame members by welding at the four corner portions. This solution encounters some issue, in particular welding distortion, which is detrimental to the sealing of the peripheral frame to the bottom and/or the top plate. Another disadvantage is the presence of a heat affected zone induced by the operation of welding which reduces the resistance of the frame and its ability to absorb crash energy.

U.S. Pat. No. 8,739,909 discloses an outer frame which has a pair of frame members having an identical rectangular sectional shape and being respectively made of aluminum alloy hollow extruded material and bent at 90° at two positions in the longitudinal direction and joined to each other so that the ends of one frame member face the ends of the other frame member.

The solution proposed by U.S. Pat. No. 8,739,909 is an appropriate solution to obtain a high capacity of volume storage of the battery box as it allows to obtain 90° angle. This solution avoids welding at the corners which is beneficial to reduce welding distortion and to increase the crush resistance. But it remains detrimental to sealing due to non-flat areas on the upper and lower side of the corner due to the bending deformation. Additionally due to the presence of a deformed area at the corner, it is not possible to fix with rivets the top cover in this area due to the lack of space to drill holes and sealing may remain difficult to achieve.

The present invention has been developed in consideration of this situation, and it is therefore an object of the invention to provide a structure for mounting a battery onto an electric vehicle or hybrid vehicle to improve the crash-resistant capability of the battery mounted on the electric vehicle while preventing increased weight and cost and ensure sealing for example by easily fixing the peripheral frame with the bottom part and/or the top cover. Another purpose of the invention is to propose a process for manufacturing such battery box.

SUMMARY OF THE INVENTION

This patent application discloses a battery box for electric or hybrid motor vehicles, comprising a peripheral frame, a bottom part and a top cover.

The peripheral frame has generally a convex polygonal shape. The bottom part is joined to a lower surface of the peripheral frame. The peripheral frame comprises at least an aluminum extruded element, bent in a single direction in at least a position along the extrusion longitudinal direction according an angle α. Said bent aluminum extruded element at the said position presents at least two different inner radii of curvatures.

The peripheral frame is composed of at least one bent aluminum extruded element. The bent region of an aluminum extruded element are located between non bent regions, so as to form at least one corner. The peripheral frame is obtained by joining the ends of said bent aluminum extruded element. The joining can be obtained either by bonding, or welding or via a joint member described in U.S. Pat. No. 8,739,909 or any other appropriate means. Preferably, the peripheral frame is obtained with four extruded elements and more preferably with two aluminum extruded elements.

Preferentially, one of said two inner radii of curvatures is more than 2 (two) times greater than the other(s), preferably more than 10 (ten) times, more preferably 30 (thirty) times greater than the other(s).

To maximize the space of the battery box, it is of interest to have the inner radii as small as possible. However, to guarantee the flatness on the upper and lower areas, the inventors propose to bend aluminum extruded element with a corner having at least two different inner radii of curvatures. Preferentially, one of said two inner radii is comprised between 1 mm to 10 mm. It is preferentially equal to 5 mm+/−3 mm.

It is then possible to obtain a satisfying flatness by having a small degree of deformation with bending because of the big radii at the chamber while having the smallest inner radii on the upper and lower parts of the bend extruded aluminum element to optimize the volume of the battery box.

This configuration improves the assembly of the bottom part to the peripheral frame, as it permits to obtain a better flatness of the lower surface of the peripheral frame. It ensures a better tightness between the peripheral frame and the bottom part after sealing.

According to the invention, in a preferred embodiment, the aluminum extruded element comprises at least three walls W1, W2, W3, and at least one hollow chamber, the length of the walls W1 and W3 being respectively L1 and L3, wherein said wall W2 is connected with at least said two other walls W1 and W3 at their extremities at least one of the said two walls W1 or W3 is connected at one extremity of said wall W2, said two walls W1 and W3 are substantially perpendicular to said wall W2 and positioned in a same half-space containing said wall W2 as a frontier, a part of said wall W2 forms a wall of said hollow chamber, said hollow chamber is located between said two walls W1 and W3 and extends in the direction of said walls W1 and W3 over a length L2 wherein the length L2 is smaller than L1 and/or L3.

In a preferred embodiment, said two walls W1 and W3 have the same length; so that L1 is equal to L3.

The bottom part and the top cover part are preferentially connected to the peripheral frame via the walls W1 and W3. It is possible to drill holes in the walls W1 and W3 to allow the connection.

In another preferred embodiment, the wall W2 is connected with the walls W1 and W3 at its two extremities, forming substantially a U shape.

In an embodiment, at least one of the walls W1 and W3 constitute a wall of the hollow chamber.

In a preferred embodiment, aluminum extruded element is bent in a single direction according to an angle of 90°.

This patent application also discloses a process for manufacturing a battery box with a peripheral frame.

The method comprises at least the following steps:

a) Providing an extruded element in aluminum alloy wherein said extruded element comprises at least three walls W1, W2, W3, and at least one hollow chamber, the length of the walls W1 and W3 being respectively L1 and L3, wherein said wall W2 is connected with at least said two other walls W1 and W3 at their extremities at least one of said two walls W1 or W3 is connected at one extremity of said wall W2, said two walls W1 and W3 are substantially perpendicular to said wall W2 and positioned in a same half-space containing said wall W2 as a frontier, a part of said wall W2 forms a wall of said hollow chamber, said hollow chamber is located between said two walls W1 and W3 and extends in the direction of said walls W1 and W3 over a length L2 wherein the length L2 is smaller than L1 and/or L3.

b) Making a notch in at least each of the two walls W1 and W3 of said extruded element, each notch presenting an axis of symmetry and an invariant point, the two invariant points of each notch being located at the same position along the extrusion longitudinal direction and the axis passing by these two invariant points is parallel to wall W2.

c) Bending in one bending direction said extruded element at least once, according an angle α, said bending direction corresponds to said axis (H) passing by the invariant points of the two notches to form a part of the peripheral frame, said part of peripheral frame presents at least two different inner radii of curvature.

Preferentially, the notch has a sinusoidal shape or a trapezoidal shape or a triangular shape or a rectangular shape or a square shape or any other shape having an axis of symmetry.

Preferentially, bending is performed by rotary draw bending or press bending.

Preferentially, bending is performed at an angle α of substantially 90°.

Preferentially, wall W2 of aluminum extruded element is connected with walls W1 and W3 at its two extremities, forming substantially a U shape.

In another preferred embodiment, one extremity of the said two walls W1 or W3 is not connected at one extremity of wall W2, forming substantially a F shape. It is of interest to propose a F shape to create a form, fitted to the bottom part. In a preferred embodiment, before step c) a part of wall W2 is cut off to allow the fitting of the corner of the bottom part to the bent extruded aluminium element. Said cut part of wall W2 presents an axis of symmetry which corresponds to the bending axis and said cut part extends in the part of wall W2 situated outside walls W1 and W3.

BRIEF DESCRIPTION OF THE DRAWINGS

FIG. 13a and FIG. 13b are top view sections of the upper part of the extruded element, with a notch. FIG. 13a presents a sinusoidal notch and FIG. 13b a trapezoidal notch.

DETAILED DESCRIPTION OF THE INVENTION

Figure 1:
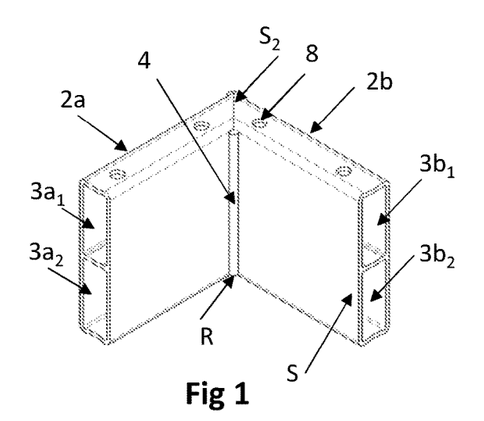
FIG. 1 is a perspective view of a part of a frame of a battery box according to the prior art.

FIG. 1 represents a part of a frame of a battery box according to the prior art constituted of two extruded elements 2a, 2b assembled by welding. Elements 2a and 2b are two similar extruded elements each with two hollow chambers, 3a1, 3a2, 3b1, 3b2, presenting a global section S perpendicular to the extrusion direction. Elements 2a and 2b are positioned each other at 90° via a surface S2. The surface S2 is obtained by cutting at 45° an extremity of each element 2a and 2b; the angle of 45° being defined with regards to the extrusion longitudinal direction. The two elements 2a and 2b rests to the surface S2 and form an angle substantially at 90°; the angle of 90° being defined as the angle formed by the extrusion direction of the two elements 2a and 2b. Finally, they are assembled by welding, typically arc welding or laser welding. A weld seam 4 is positioned at the corner of the two elements 1a and 1 b. The frame is drilled at different positions to allow the fixture of a cover (not shown).

Figure 2:
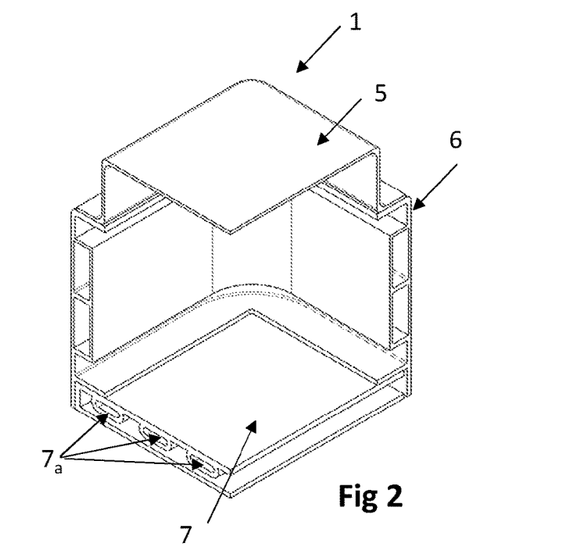
FIG. 2 is a perspective view of a part of a battery box according to the invention.
Figure 3:
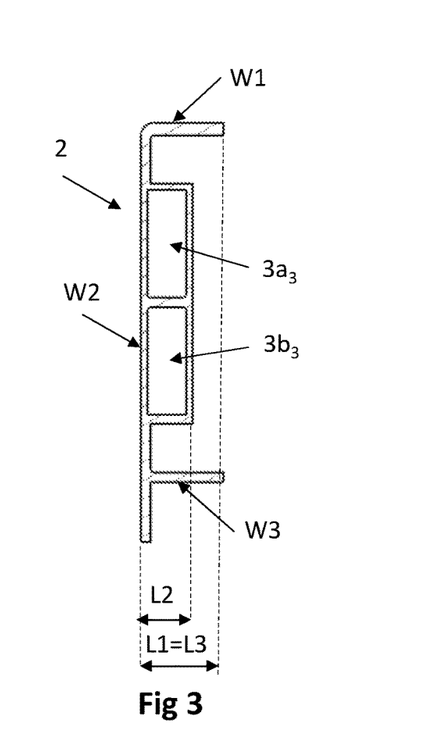
FIG. 3 is a cross-section of the extruded element which is used to form the frame of the battery box, shown at FIG. 2.

FIG. 2 represents a perspective view of a part of a battery box 1 according to the invention which is constituted of a top cover 5, a peripheral frame 6 and a bottom part 7. The bottom part 7 is generally made of a base plate or an extruded part. Depending on the geometry or the size of the bottom part, the bottom part is possibly made by an assembly of base plates or extruded parts. The bottom part 7 permits preferentially to control the temperature inside the battery box. For this purpose, channels 7a are preferably located in the bottom part 7 to allow a fluid circulation. Using extruded element with hollow chambers, as represented in FIG. 2 is interesting as it allows to integrate channels 7a into the bottom part in an easy and economical operational procedure, whereas if a base plate or sheet is used, cooling facilities can be obtained by corrugating the sheet structure or by adding cooling tubes. A peripheral frame 6 surrounds the periphery of the bottom part 7. The peripheral frame 6 comprises an extruded element 2, whose section is presented at FIG. 3. It comprised two hollow chambers 3a3, 3b3, a wall W2 which constitutes a wall of said hollow chambers, two walls W1 and W3, connected at their extremity to wall W2, perpendicularly to W2. W1 is connected at one extremity of wall W2. W3 is connected at a given distance from the other extremity of wall W2, forming substantially a F shape. The extremities of walls W1 and W3, not connected with W2 are positioned in the same semi half space containing said wall W2 as a frontier. The two hollow chambers are positioned between walls W1 and W3. The two hollow chambers extend in the direction perpendicular to the extrusion direction over a distance L2. Walls W1 and W3 have respectively a length L1 and L3. Walls W1 and W3 have the same length. The length L2 is smaller than L1 and/or L3.

Figure 4:
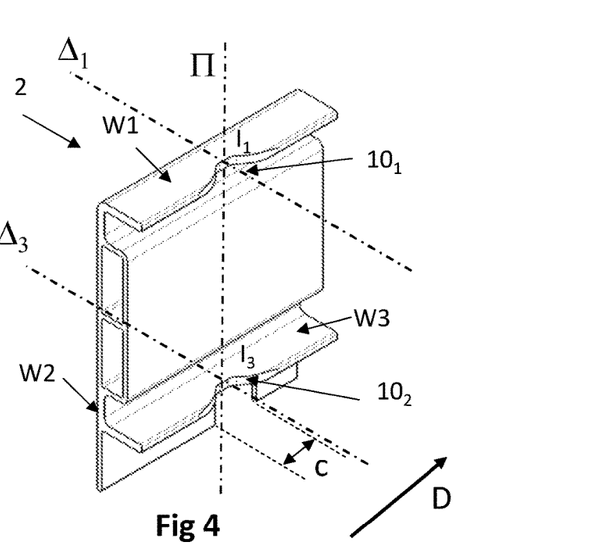
FIG. 4 is perspective view of the extruded element of the battery box, notched before bending.

A notch $10_1$ and $10_3$ is performed in the two walls W1 and W3 as illustrated at FIG. 4. The notch consists in a trapezoidal shape, which present an axis of symmetry Δ1, Δ3. The two invariant points 11 and 13 positioned on these axis of symmetry are positioned on a same axis 11 perpendicular to the extrusion direction D. Additionally to the notches, it is preferred to cut-off a part of the wall W2 on a width C to enhance bending. The cut-off is performed in the part of the wall W2, situated outside walls W1 and W3, i.e. the cut-off is not between the two walls W1 and W3.

Figure 5:
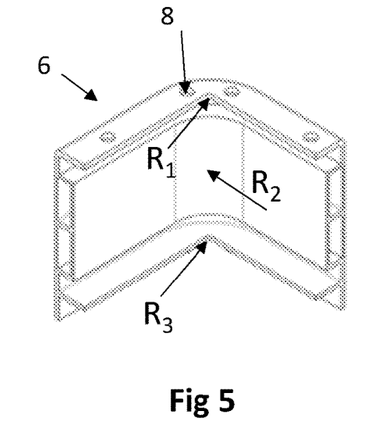
FIG. 5 corresponds to a perspective view of the frame shown at FIG. 2. The view of the perspective is from the interior of the battery box.
Figure 6:
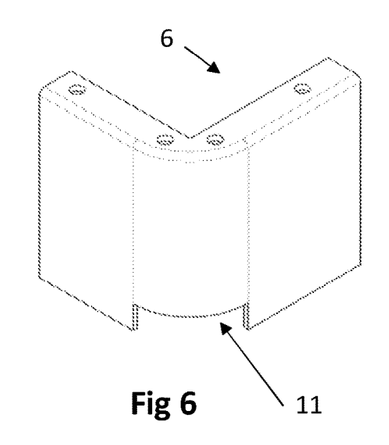
FIG. 6 corresponds to a perspective view of the same frame as FIG. 5; the view of the perspective is from the exterior of the battery box.
Figure 7:
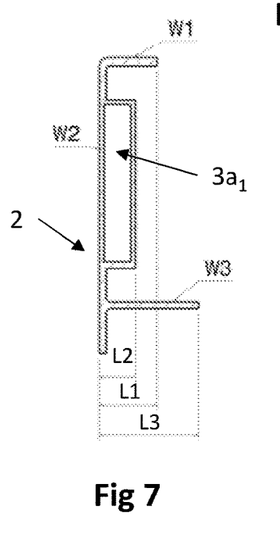
FIG. 7 to 12 are other typical cross section of extrusion according to the invention.
Figure 8:
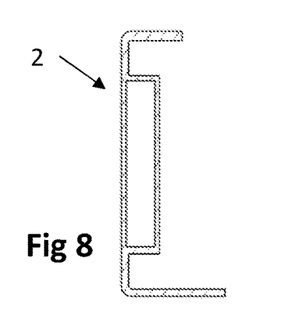
Figure 9:
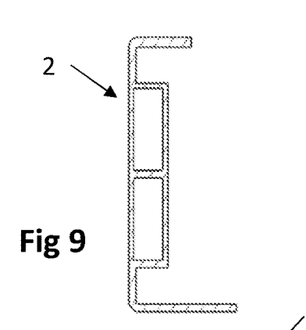

The extruded element notched and preferentially cut-off is then bent according to the invention to form a part of the peripheral frame (FIG. 5 and FIG. 6). Said part presents at least two different inner radii. The part of the frame presents an inner radius of curvature R2 in the hollow chamber area higher than the inner radius of curvature R1 and R3 located in the area of walls W1 and W3. Typically R2 is 2 times R1 or R3, preferably 10 and more preferably 30 times R1 or R3.

A top cover 5 is preferentially positioned on the top of the peripheral frame 6 and allows to close the battery box. It is fixed to the peripheral frame for example by rivets or bolts, via the holes illustrated at FIG. 5 and FIG. 6.

Figure 10:
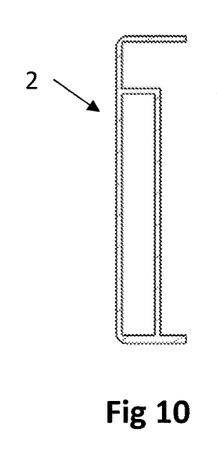
Figure 11:
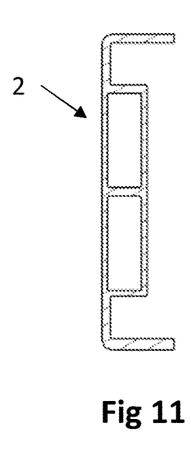
Figure 12:
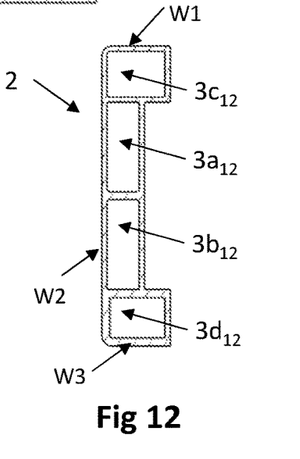

FIG. 7 to FIG. 12 represent different cross section of extruded element 2 that can be used to form the peripheral frame 6 of the battery box. It corresponds to different geometries, where the walls W1 and W3 present different length (FIG. 7, FIG. 8, FIG. 9) or not (FIG. 10, FIG. 11, FIG. 12) presenting one (FIG. 7, FIG. 8, FIG. 10), two (FIG. 9, FIG. 11) or four (FIG. 12) hollow chambers. FIG. 10 presents an extruded element 2 for which part of wall W2 and W3 are also walls of the hollow chamber. FIG. 12 presents an extruded element 2 with 4 hollow chambers, for which walls W1, W2 and W3 are also walls of the hollow chambers.

Figure 19:
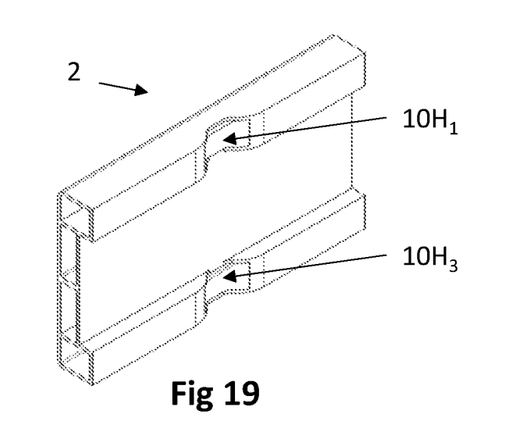
FIG. 19 is a perspective view of the notch part of the extruded element presented at FIG. 12.

With that respect, FIG. 19 presents the notched extruded element 2. The notch $10H_1$ and $10H_3$ present a trapezoidal shape in this case. It extends over all the height of the hollow chamber $3c_{12}$ and $3d_{12}$ for which W1 and W3 constitute one complete wall.

Figure 13A:
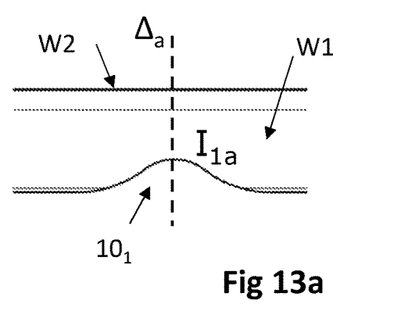
Figure 13B:
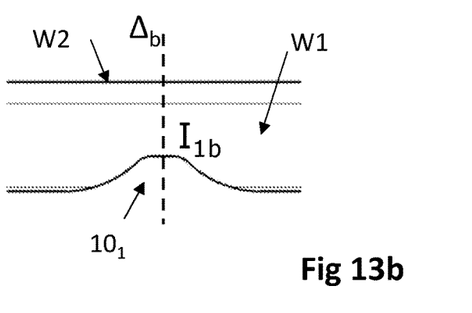

FIG. 13a and FIG. 13b represents a top view of wall W1. A notch $10_1$ is represented. It presents a sinusoidal shape at FIG. 13a and a trapezoidal shape at FIG. 13b. In each case, the shape of the notch $10_1$ presents an axis of symmetry $\Delta_a$, $\Delta_b$ and an invariant point $I_{1a}$, $I_{1b}$. The shape of the notch can be either a triangular shape, a circular shape, a rectangular shape or any of shape having an axis of symmetry.

Figure 14A:
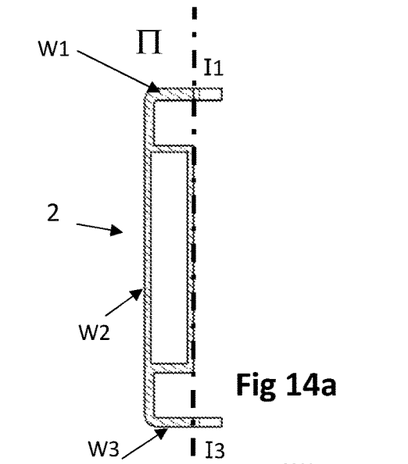
FIG. 14a is a cross section of an extruded element with a trapezoidal notch and FIG. 14b is its perspective view.
Figure 14B:
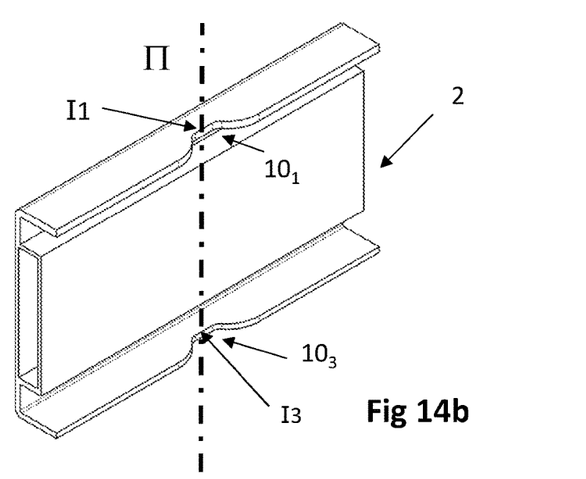

FIG. 14a represents an extruded element 2 in cross section with a notch $10_1$, $10_3$ respectively in walls W1 and W3. The two notches present each an invariant point $I_1$, $I_3$ which are positioned on an axis Π, perpendicular to the extrusion longitudinal direction. FIG. 14b is a perspective view of FIG. 14a.

Figure 15A:
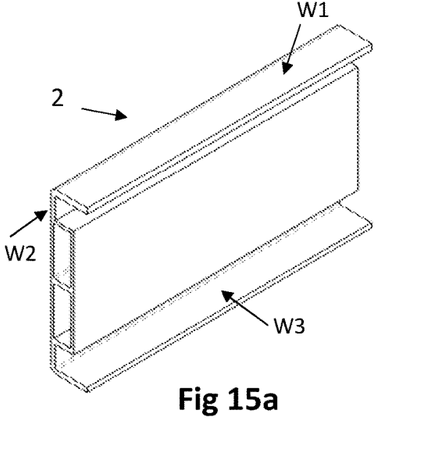
FIG. 15a is a perspective view of an extruded element and FIG. 15b represents the perspective view of the extruded element with a notch.
Figure 15B:
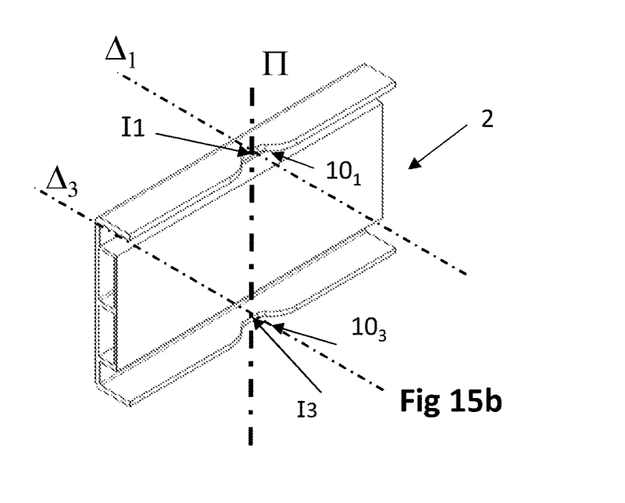

FIG. 15a is a perspective view of an extruded element with two hollow chambers with walls W1 and W3 connected at each extremity of wall W2. FIG. 15b represents the perspective view of the extruded element with a notch, which presents a similar shape to the notch presented at FIG. 14b. Two notches present each an invariant point $I_1$, $I_3$ which are positioned on an axis Π, perpendicular to the extrusion direction.

Figure 16A:
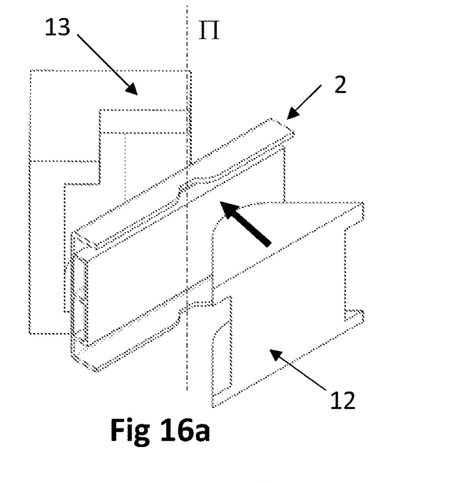
FIG. 16a and FIG. 16b represents two steps of the method to bend the frame.
Figure 16B:
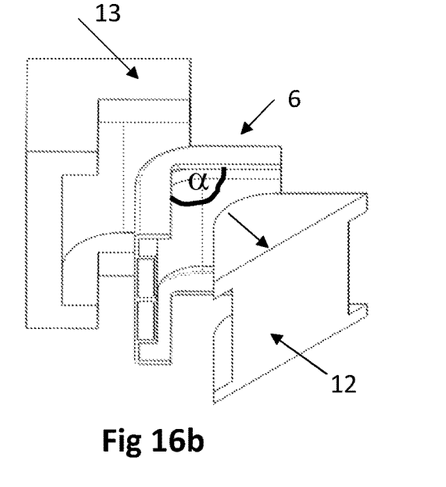
Figure 18:
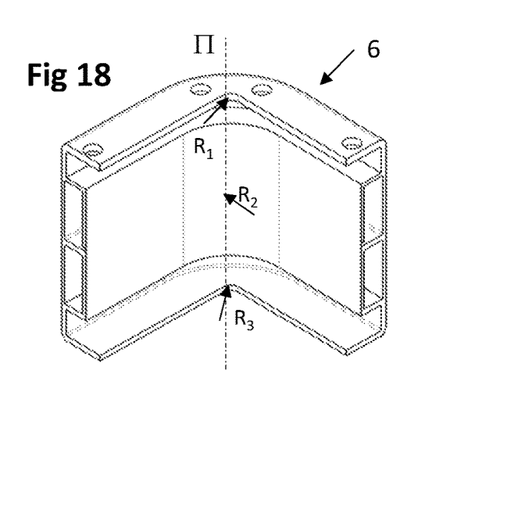
FIG. 18 represents the frame.

FIG. 16a and FIG. 16b presents one alternative of bending according to one bending axis to produce the frame according to the invention. It consists in push bending. Said notched extruded element presented at FIG. 15b is placed between a bending die 12 and a pressure die 13. Said bending die presents a radius of curvature. This radius of curvature is substantially similar to one radius of curvature of the final frame. The notches of the extruded elements are positioned in such a way that the Π axis, axis linking the two invariant points of the notches corresponds to the bending axis. A force is applied to the extruded element via the bending die. A die pushes the extrusion onto the pressure die 13 forcing the extrusion to be bent at an angle of α. Preferentially, the angle α is substantially 90°. The bending die 12 and the pressure die 13 have a special design to fit with the shape of the extruded element 2. After completion of the bending, the force is released and the bent extruded element can be removed. It allows to obtain a frame which presents at least two different radii of curvatures (R1, R2, R3) at position Π; one the two said radii of curvatures is more than 2 times greater than the other(s) as illustrated at FIG. 18.

Figure 17A:
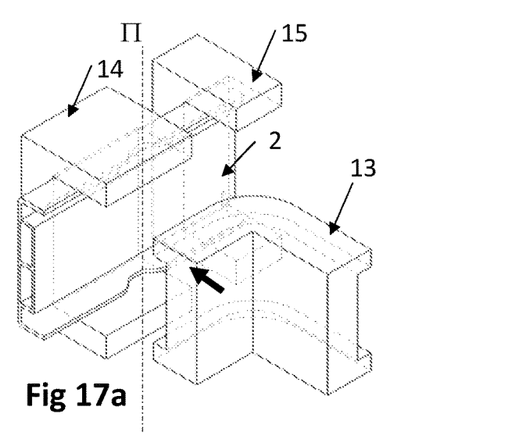
FIG. 17a to FIG. 17c represent three steps of the method to bend the frame by roll bending.
Figure 17B:
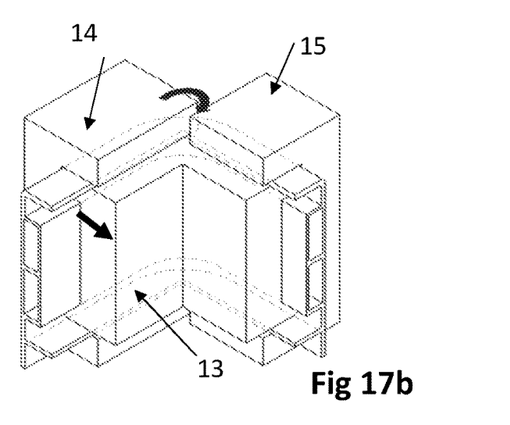
Figure 17C:
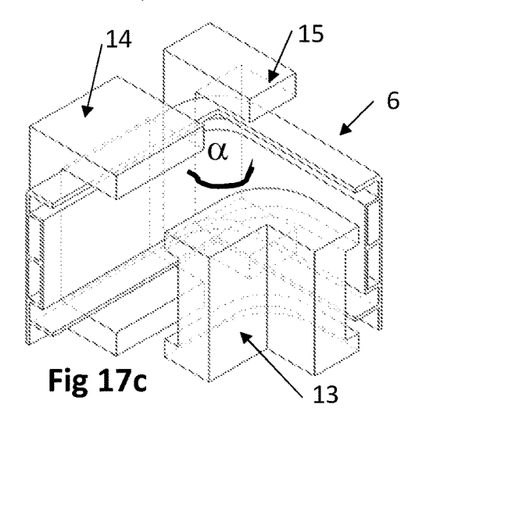

FIG. 17 represent another alternative of bending. It consists in a rotary draw bending. Said notched extruded element 2 presented at FIG. 15b is placed between a pressure die 13, a clamp die 14 and a rotating bending die 15. The notches of the extruded elements are positioned in such a way that the Π axis, axis linking the two invariant points corresponds to the bending axis. The notched extruded element is secured to the bending form by the clamping die (FIG. 17a). As the bending die rotates, it draws the element against the pressure die (FIG. 17b). The pressure die 13, the clamp die 14 and the rotating bending die 15 have a special design to fit with the shape of the extruded element 2. The pressure die may remain fixed or move with the element to eliminate the friction of sliding contact. After completion of the bending, the rotating bending die released the effort by coming back to its initial position and the bent extruded element can be removed. As the other alternative of bending, this method allows to a frame which presents at least two different radii of curvatures ($R_1$, $R_2$, $R_3$) at position Π; one the two said radii of curvatures is more than 2 times greater than the other(s) as illustrated at FIG. 18.

Whereas this invention is here illustrated and described with reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

The invention claimed is:

1. A battery box for electric or hybrid motor vehicles, comprising a peripheral frame which has a generally convex polygonal shape, a bottom part and a top cover; the bottom part being joined to a lower surface of the peripheral frame, said peripheral frame comprising at least an aluminum extruded element, bent in a single direction in at least a position (Π) along the extrusion longitudinal direction according an angle α wherein said bent aluminum extruded element at the said position (Π) presents at least two different inner radii of curvatures ($R_1$, $R_2$, $R_3$).

2. A battery box according to claim 1 wherein one of said two inner radii of curvatures is more than 2 times greater than the other(s).

3. A battery box according to claim 1 wherein the aluminum extruded element comprises at least three walls W1, W2, W3, the length of the walls W1 and W3 being respectively L1 and L3, and at least one hollow chamber and wherein said wall W2 is connected with at least said two other walls W1 and W3 at their extremities,
at least one of the said two walls W1 or W3 is connected at one extremity of said wall W2,
said two walls W1 and W3 are substantially perpendicular to said wall W2 and positioned in a same half-space containing said wall W2 as a frontier,
a part of said wall W2 forms a wall of said hollow chamber,
said hollow chamber is located between the two said walls W1 and W3 and extends in the direction of said walls W1 and W3 over a length L2 wherein the length L2 is smaller than L1 and/or L3.

4. A battery box according to claim 3 wherein L1 is equal to L3.

5. A battery box according to claim 3 wherein said wall W2 is connected with walls W1 and W3 at its two extremities, forming substantially a U shape.

6. A battery box according to claim 1 wherein said aluminum extruded element is bent in a single direction according to an angle 90°.

7. A process for manufacturing a battery box with a peripheral frame, comprising at least the following steps,
a) Providing an extruded element in aluminium alloy wherein said extruded element comprises at least three walls W1, W2, W3, the length of the walls W1 and W3 being respectively L1 and L3 and at least one hollow chamber, said wall W2 is connected with at least said two other walls W1 and W3 at their extremities, at least one of the said two walls W1 or W3 is connected at one extremity of said wall W2, said two walls W1 and W3 are substantially perpendicular to said wall W2 and positioned in a same half-space containing said wall W2 as a frontier, a part of said wall W2 forms a wall of said hollow chamber, said hollow chamber is located between the two said walls W1 and W3 and extends in the direction of said walls W1 and W3 over a length L2 wherein the length L2 is smaller than L1 and/or L3, b) Making a notch in each two walls W1 and W3 of said extruded element, each notch presents an axis of symmetry ($\square$) and an invariant point, the two invariant points of each notch are located at the same position according to the extrusion direction and the axis ($\Pi$) passing by these two invariant points is parallel to wall W2, c) Bending in one bending direction said extruded element at least once, according an angle $\alpha$, said bending direction corresponds to said axis ($\Pi$) passing by the invariant points of the two notches to form a part of the peripheral frame, said part of peripheral frame presents at least two different inner radii of curvature.

8. A process for manufacturing a battery box according to claim 7 wherein the notch has a sinusoidal shape or a trapezoidal shape or a triangular shape or a rectangular shape or a square shape.

9. A process for manufacturing a battery box according to claim 7 wherein bending is performed by rotary draw bending or press bending.

10. A process for manufacturing a battery box according to claim 7 wherein bending is performed at substantially 90°.

11. A process for manufacturing a battery box according to claim 7 wherein said wall W2 of aluminum extruded element is connected with said walls W1 and W3 at its two extremities, forming substantially a U share.

12. A process for manufacturing a battery box according to claim 7 wherein one extremity of said two walls W1 or W3 is not connected at one extremity of said wall W2, forming substantially an F shape.

13. A process for manufacturing a battery box according to claim 12 wherein before step c) a part of said wall W2 is cut off.

14. A process for manufacturing a battery box according to claim 12 wherein said cut part of wall W2 presents an axis of symmetry which corresponds to the bending axis and said cut part extends in the part of wall W2 situated outside said walls W1 and W3.

* * * * *